United States Patent
Sanders et al.

(10) Patent No.: US 7,327,802 B2
(45) Date of Patent: Feb. 5, 2008

(54) METHOD AND APPARATUS FOR CANCELING THE TRANSMITTED SIGNAL IN A HOMODYNE DUPLEX TRANSCEIVER

(75) Inventors: Stuart B. Sanders, Cary, NC (US); Richard Timmons, Raleigh, NC (US)

(73) Assignee: SIRIT Technologies Inc., Toronto, Ontario (CA)

( * ) Notice: Subject to any disclaimer, the term of this patent is extended or adjusted under 35 U.S.C. 154(b) by 241 days.

(21) Appl. No.: 10/804,198

(22) Filed: Mar. 19, 2004

(65) Prior Publication Data
US 2005/0207509 A1    Sep. 22, 2005

(51) Int. Cl.
*H04B 15/00* (2006.01)
*H04K 1/02* (2006.01)

(52) U.S. Cl. .................. 375/285; 375/296; 375/346; 370/284; 370/286

(58) Field of Classification Search .......... 375/285, 375/295, 296, 347–349, 303, 304, 286, 227, 375/329, 335, 336; 370/286–292; 342/148, 342/174; 455/562, 572
See application file for complete search history.

(56) References Cited

U.S. PATENT DOCUMENTS

| | | | | |
|---|---|---|---|---|
| 4,321,549 | A | | 3/1982 | Hansen .................. 329/50 |
| 4,577,309 | A | * | 3/1986 | Barazeche et al. .......... 370/286 |
| 6,531,957 | B1 | * | 3/2003 | Nysen ..................... 340/10.1 |
| 6,567,648 | B1 | * | 5/2003 | Ahn et al. ................. 455/83 |
| 6,686,830 | B1 | * | 2/2004 | Schirtzer ................. 340/10.2 |
| 7,072,614 | B1 | * | 7/2006 | Kasperkovitz ............. 455/24 |
| 7,099,662 | B2 | * | 8/2006 | Fuenfgeld et al. .......... 455/423 |
| 2003/0060227 | A1 | * | 3/2003 | Sekine et al. .............. 455/550 |
| 2003/0184469 | A1 | * | 10/2003 | Brosche et al. ............. 342/70 |
| 2003/0193997 | A1 | * | 10/2003 | Dent et al. ................. 375/219 |
| 2004/0052220 | A1 | * | 3/2004 | Chen et al. ................. 370/286 |
| 2004/0090309 | A1 | * | 5/2004 | Taki et al. ................. 340/10.1 |
| 2004/0101067 | A1 | | 5/2004 | Abe et al. |
| 2004/0185815 | A1 | * | 9/2004 | Fukuda et al. ............. 455/296 |
| 2004/0212529 | A1 | * | 10/2004 | Fehrenbach et al. ........ 342/124 |

OTHER PUBLICATIONS

International Preliminary Report on Patentability under Chapter I of the Patent Cooperation Treaty and Written Opinion of the International Searching Authority for International application No. PCT/US2005/040848, filed Nov. 10, 2005 and mailed by PCT officer, Yoshiko Kuwahara on May 31, 2007, (8 pages).

(Continued)

*Primary Examiner*—Chieh M. Fan
*Assistant Examiner*—Qutub Ghulamali
(74) *Attorney, Agent, or Firm*—Fish & Richardson P.C.

(57) ABSTRACT

An apparatus comprises a transmitter, a receiver, an antenna and a signal cancellation circuit. The transmitter is configured to send a transmitter signal associated with a frequency. The receiver is associated with the frequency. The antenna is coupled to the transmitter and the receiver. The signal cancellation circuit is coupled to the transmitter, the receiver and the antenna. The signal cancellation circuit is configured to phase shift a first portion of the transmitter signal to produce a phase-shifted signal. The signal cancellation circuit is configured to combine the phase-shifted signal with a second portion of the transmitter signal to produce a combined signal. The second portion of the transmitter signal is associated with a reflection of a third portion of the transmitter signal from the antenna. The first portion, the second portion and the third portion of the transmitter signal are different from each other.

13 Claims, 2 Drawing Sheets

OTHER PUBLICATIONS

International Search Report and Written Opinion of the International Searching Authority issued in PCT Application No. PCT/US2005/08902 on Jul. 17, 2006; 13 pages.

International Preliminary Report on Patentability under Chapter I issued in PCT Application No. PCT/US2005/08902 on Sep. 28, 2006; 8 pages.

* cited by examiner

METHOD AND APPARATUS FOR CANCELING THE TRANSMITTED SIGNAL IN A HOMODYNE DUPLEX TRANSCEIVER

BACKGROUND

1. Field of the Invention

In general, the invention relates to signal cancellation in a transceiver. More particularly, the invention relates to a method and system to cancel the transmitted signal in a homodyne duplex transceiver. This signal is an unwanted source of receiver degradation; thus, canceling it out results in a significant performance advantage.

2. Discussion of Background

In a known transceiver without signal cancellation, a single antenna is shared by the transmitter portion and receiver portion while simultaneously transmitting and receiving on the same frequency. See FIG. 1.

The known transceiver 100 includes a controller 110, a frequency source 120, a transmitter modulator 130, a variable gain amplifier (VGA) 140, a power amplifier (PA) 150, a detector 160, a circulator 170, an antenna 180, an antenna connector 185 and a receiver 190. Controller 110 is a microprocessor. The frequency source 120 is a frequency agile synthesizer. Detector 160 can measure the power output by the transmitter modulator 130.

The output of transmitter modulator 130 is calibrated using an accurate power sensor (not shown) at the antenna connector 185 by adjusting the gain setting of VGA 140, and then storing the gain setting of VGA 140 and the detector reading that produced the desired output power level(s). The transmitter modulator 130 and receiver 190 operate on the same frequency, and thus the performance of receiver 190 is adversely affected by the energy from transmitter modulator 130 that is reflected back from antenna 180, which is non-ideal in its implementation. If all radio frequency (RF) components in the transceiver modulator 130 are precisely 50 ohms, for example, then all energy from transmitter modulator 130 applied to antenna 180 is radiated, and no energy reflects back towards receiver 190. Because an ideal 50-ohm implementation is not realistically achievable, receiver 190 will experience degraded performance due to the energy reflected from the transmitter modulator 130 by antenna 180, relative to the weaker signal sent to receiver 190 detected by the detector.

The signal level reflected back from antenna 180 is, for example, typically between 15 to 25 dB below the signal from the transmitter modulator 130 and radiated by antenna 180. The energy level of the signal reflected back to receiver 190 can be, for example, as high as 100 mW. This can cause signal overload of the sensitive components of receiver 190, resulting in degradation of the sensitivity and range of receiver 190. For the case of a homodyne receiver, this can cause a large direct current (DC) (i.e., 0 Hz) component.

SUMMARY OF THE INVENTION

An apparatus comprises a transmitter, a receiver, an antenna and a signal cancellation circuit. The transmitter is configured to send a transmitter signal associated with a frequency. The receiver is associated with the frequency. The antenna is coupled to the transmitter and the receiver. The signal cancellation circuit is coupled to the transmitter, the receiver and the antenna. The signal cancellation circuit is configured to phase shift a first portion of the transmitter signal to produce a phase-shifted signal. The signal cancellation circuit is configured to combine the phase-shifted signal with a second portion of the transmitter signal to produce a combined signal. The second portion of the transmitter signal is associated with a reflection of a third portion of the transmitter signal from the antenna. The first portion, the second portion and the third portion of the transmitter signal are different from each other.

DETAILED DESCRIPTION

In an embodiment of the invention, a transceiver having a signal cancellation circuit simultaneously transmits and receives signals on the same frequency while sharing a single antenna. In particular, a reflected signal from an antenna can be reduced significantly (for example, by 30 dB or more) via a signal cancellation circuit that takes a small amount of the transmitter signal (adjusted in amplitude to be substantially equal in amplitude to the reflected signal), and shifts the phase of the signal such that the phase-shifted signal is 180° out of phase with the reflected signal. Consequently, when the two signals are combined, a signal having reduced amplitude is produced. Such signal can also be referred to as a "cancelled" signal or can have, for example, significantly reduced amplitude.

Figure 1:
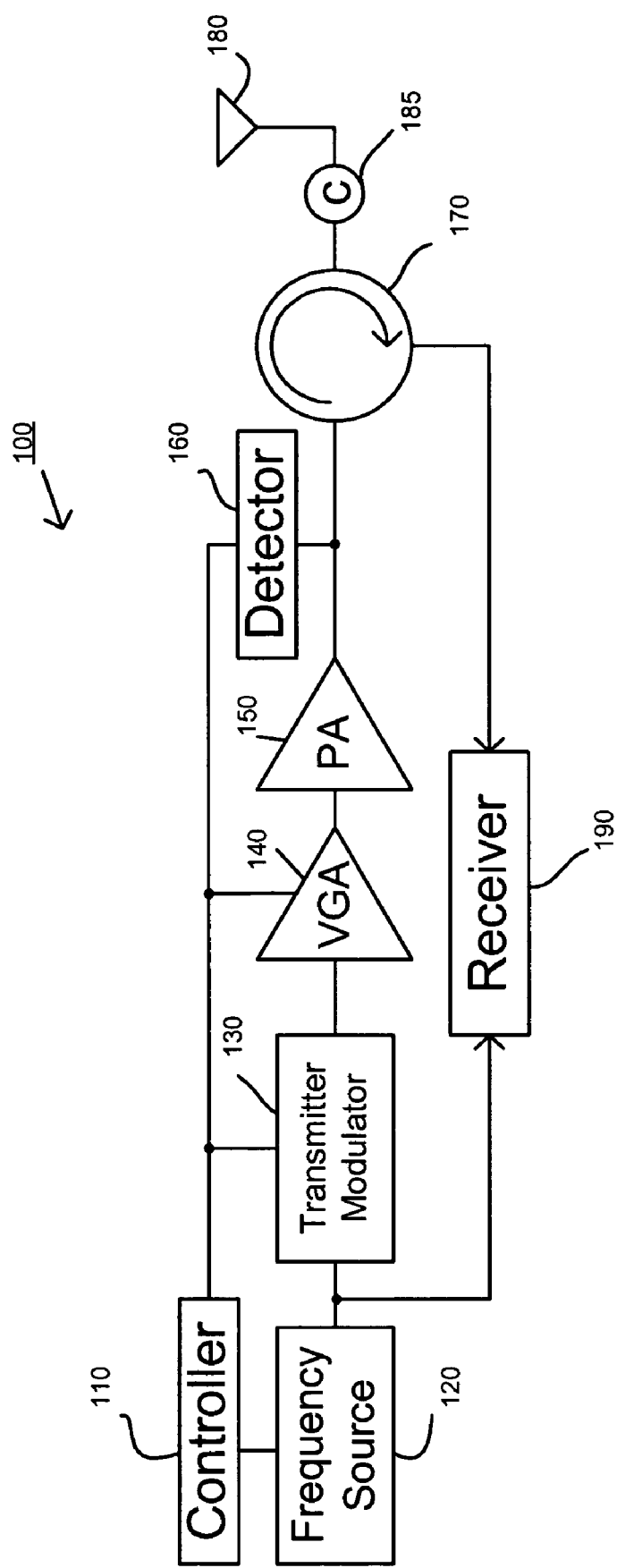
FIG. 1 shows a block diagram of a known transceiver.
Figure 2:
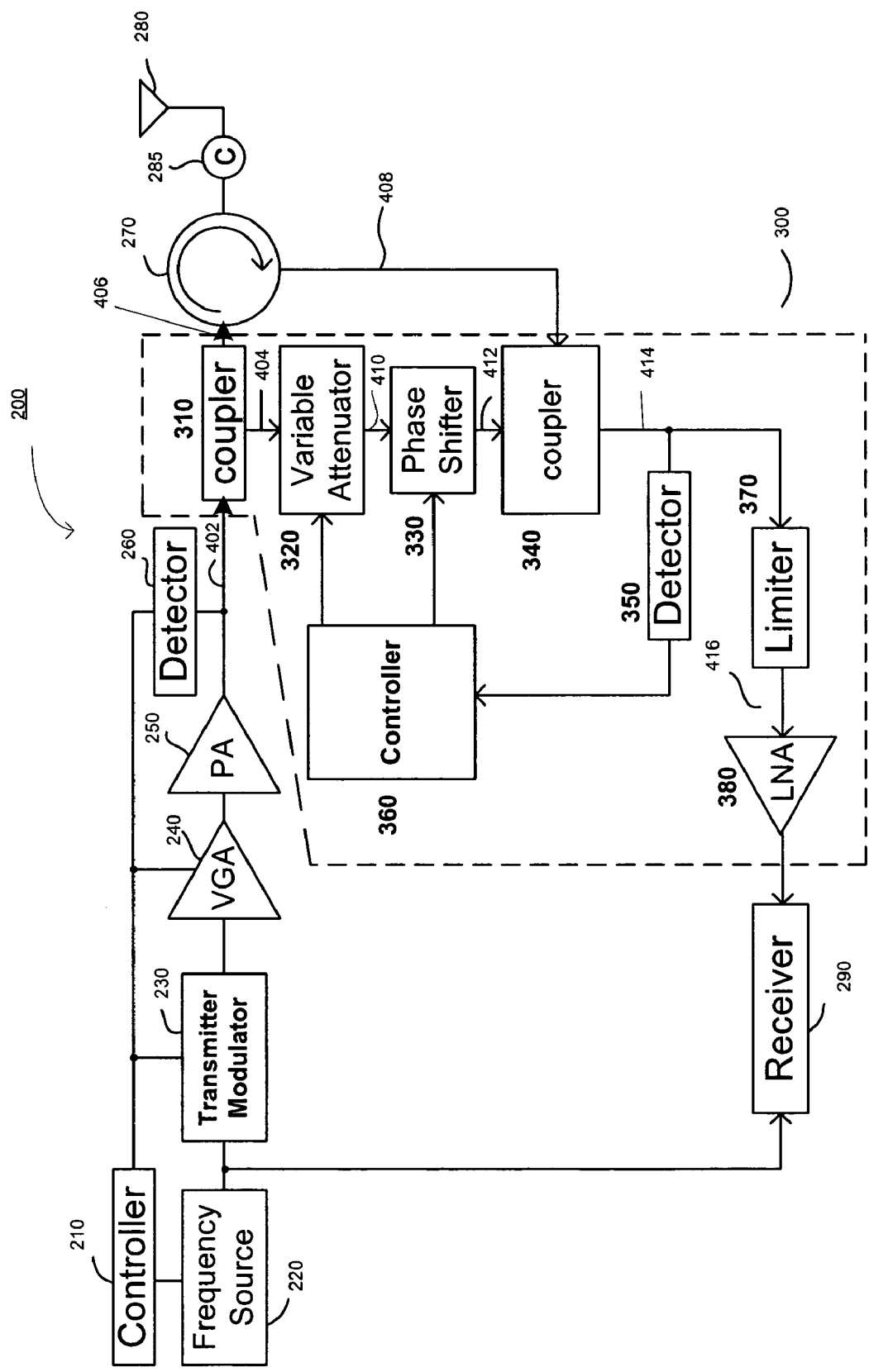
FIG. 2 shows a block diagram of a transceiver having signal cancellation circuitry, according to an embodiment of the invention

FIG. 2 shows a block diagram of a transceiver having a signal cancellation circuit, according to an embodiment of the invention. As shown in FIG. 2, the transceiver 200 includes a controller 210, frequency source 220, transmitter modulator 230, VGA 240, PA 250, detector 260, circulator 270, antenna coupler 285, antenna 280 and receiver 290. Transceiver 200 also includes signal cancellation circuit 300 having coupler 310, variable attenuator 320, phase shifter 330, coupler/combiner 340, detector 350, controller 360, limiter 370 and low noise amplifier (LNA) 380. Each of the components of the signal cancellation circuit 300 is discussed below.

Coupler 310 can be, for example, a directional coupler inserted between the output of PA 250 and circulator 270. Coupler 310 receives signal 402 and sends signals 404 and 406 where signal 404 has a smaller amplitude than the amplitude of signal 406. Signal 404 can used to cancel the reflected signal from the antenna 280 as described below in more detail.

Variable attenuator 320 can be, for example, a variable attenuator used to adjust the amplitude of signal 404 so that the amplitude of the signal 412 substantially corresponds to the amplitude of signal 408 at combiner 340, where signal 408 is reflected from antenna 280. Phase shifter 330 can be, for example, a phase shifter configured to adjust the phase of the signal 410 180° relative to the phase of the signal 408 reflected from antenna 280 and received by coupler 340.

Coupler 340 can be, for example, a signal coupler configured to combine signal 412 with signal 408 reflected from the antenna. In other words, after variable attenuator 320 adjusts the amplitude of signal 404 and phase shifter 330 adjusts the phase of signal 410, coupler 340 combines signal 412 with signal 408 received as reflection from antenna 280.

Detector 350 can be, for example, a power detector configured to measure the power of signal 414. Detector 350 provides the detected power of signal 414 to controller 360. Controller 360 is configured to adjust variable attenuator 320 based on the detected power of signal 414. More specifically, controller 360 provides a control signal to variable attenuator 320 so that variable attenuator 320 modifies the amplitude of signal 404 to substantially correspond to the amplitude of signal 408.

Controller 360 is also configured to adjust phase shifter 330 based on the detected power of signal 414. More specifically, controller 360 provides a control signal to phase shifter 330 so that the phase of signal 412 is shifted substantially 180° from signal 408 reflected from the antenna. The output of detector 350 can be minimized, for example, when the amplitude of signals 412 and 408 are substantially equal, and the phase of signals 412 and 408 are substantially 180° relative to each other.

Detector 350 can also be coupled elsewhere within signal cancellation circuit 300. Such alternative locations of detector 350 within signal cancellation circuit 300 can provide an alternative measure of selectivity and sensitivity. Such alternative locations can be, for example, between LNA 380 and receiver 290, or after the mixer (not shown) of the receiver 290.

Controller 360 can be configured, for example, as a control loop used to adjust the amplitude and phase of signal 404 so that signal 414 output by coupler 340 as detected by detector 350 is minimized. As described above, controller 360 provides control signals to variable attenuator 320 and phase shifter 330, which adjust the amplitude and phase, respectively, of signal 404 based on these control signals.

Limiter 370 receives signal 414 and outputs signal 416. Limiter 370 is configured to limit the amplitude of signal 414 to produce signal 416 thereby protecting LNA 380. More specifically, LNA 380 is configured to amplify signal 416 to improve the sensitivity performance and range of the receiver 290. Before such amplification, however, the amplitude of signal 416 provided to LNA 380 is limited by limiter 370 to protect LNA 380 from damage by a high signal level reflected from the antenna, prior to the cancellation adjustment/refinement via controller 360.

Various alternative embodiments are possible. For example, in one embodiment, the transceiver includes an optional memory device (not shown). In such an embodiment, the transceiver detectors (e.g., detectors 260 and 350) can be calibrated based on the calibrated data stored in the memory device of the transceiver. By calibrating the transceiver detectors based on the calibration data, the time it takes to minimize the cancellation by the signal cancellation circuit can be minimized.

Similarly, transmitter modulator 230 can be calibrated by using a power meter (not shown) at antenna connector 285, and by adjusting VGA 240 until the desired power output from transmitter modulator 230 is achieved. The setting of VGA 240 and the detected power of PA 250 can be stored in the optional memory device for each possible output power setting of transmitter modulator 230. Finally, with variable attenuator 320 set for maximum attenuation, a signal can be applied to antenna connector 285 while calibrating detector 350 over its usable range.

In another embodiment, a "training" sequence can be implemented in which variable attenuator 320 is set for maximum attenuation and detector 350 (previously calibrated) measures the power level of the reflected signal (e.g., signal 414). Based on the current power level detected by detector 260, the initial value of variable attenuator 320 can be approximated to achieve a best guess of "equal amplitude," and then phase shifter 330 can be adjusted to minimize the power level of the signal 414 detected by detector 350. Subsequently, variable attenuator 320 can be fine tuned to produce a minimum power level of signal 414 detected by detector 350, and then phase shifter 330 can be fine tuned to produce a minimum power level of signal 414 detected by detector 350.

CONCLUSION

While various embodiments of the invention have been described above, it should be understood that they have been presented by way of example only, and not limitation. Thus, the breadth and scope of the invention should not be limited by any of the above-described examples of embodiments, but should be defined only in accordance with the following claims and their equivalents.

While the invention has been particularly shown and described with reference to embodiments thereof, it will be understood by those skilled in the art that various changes in form and details may be made therein without departing from the spirit and scope of the invention.

What is claimed is:

1. An apparatus, comprising:
   a transmitter configured to send a transmitter signal associated with a frequency;
   a receiver associated with the frequency;
   an antenna coupled to the transmitter and the receiver; and
   a signal cancellation circuit coupled to the transmitter, the receiver and the antenna, the signal cancellation circuit configured to phase shift by substantially 180 degrees a first portion of the transmitter signal that does not include a reception signal to produce a phase-shifted signal, the signal cancellation circuit configured to combine the phase-shifted signal with a second portion of the transmitter signal to produce a combined signal, the second portion of the transmitter signal being associated with a reflection of a third portion of the transmitter signal from the antenna, the first portion, the second portion and the third portion of the transmitter signal being different from each other, and where the signal cancellation circuit is further configured to execute a training sequence including generating a detector signal based on an amplitude of the training sequence of the transmitter signal, modifying a first amplitude of the first portion of the transmitter signal based on the detector signal, and modifying a second amplitude of the first portion of the transmitter signal such that the second amplitude of the first portion of the transmitter signal is substantially equal to an amplitude of the second portion of the transmitter signal.

2. The apparatus of claim 1, wherein the signal cancellation circuit comprises:
   a first coupler coupled to the transmitter and the antenna, the first coupler configured to receive the first portion of the transmitter signal;
   a phase shifter coupled to the first coupler, the phase shifter configured to phase shift the phase of the transmitter signal by substantially 180 degrees to produce the phase-shifted signal; and
   a second coupler coupled to the phase shifter and the antenna, the second coupler configured to combine the phase-shifted signal and the second portion of the transmitter signal to produce the combined signal, the second coupler configured to send the combined signal to the receiver and coupled to the antenna.

3. The apparatus of claim 2, further comprising a homodyne transceiver comprising the receiver and a transmitter, the homodyne transceiver being associated with the frequency and coupled to the antenna via the first coupler.

4. The apparatus of claim 1, wherein a magnitude of the first portion of the transmitter signal is substantially equal to a magnitude of the second portion of the transmitter signal.

5. The apparatus of claim 1, wherein the signal cancellation circuit comprises:
   a first coupler coupled to the transmitter and the antenna, the first coupler configured to receive the first portion of the transmitter signal;
   a variable attenuator coupled to the first coupler, the variable attenuator configured to modify a magnitude of the transmitter signal to produce a first modified signal;
   a phase shifter coupled to the first coupler, the phase shifter configured to phase shift a phase by substantially 180 degrees of the first modified signal to produce a second modified signal; and
   a second coupler coupled to the phase shifter, the receiver and the antenna, the second coupler configured to combine the second modified signal and the second portion of the transmitter signal to produce the combined signal, the second coupler configured to provide the combined signal to the receiver.

6. The apparatus of claim 5, wherein the circuit comprises a detector and a controller, the controller being coupled to the first coupler, the second coupler and the detector, the detector being configurable based on calibration data and operable to generate the detector signal, the controller configured to modify the phase of the transmitter signal based on the calibration data.

7. The apparatus of claim 5, wherein the circuit comprises a detector and a controller, the controller being coupled to the first coupler, the second coupler and the detector, the detector being configurable based on calibration data while the variable attenuator is set to a maximum level, and the detector being operable to generate the detector signal.

8. The apparatus of claim 1, further comprising a frequency source coupled to the transmitter and the receiver, the frequency source configured to provide a carrier signal having the frequency to the transmitter and the receiver.

9. The apparatus of claim 1, wherein the signal cancellation circuit comprises:
   a first coupler coupled to the transmitter and the antenna;
   a second coupler coupled to the antenna; and
   a circulator coupled to the first coupler, the second coupler, and the antenna, the circulator configured to forward the third portion of the transmitter signal from the first coupler to the antenna, the circulator configured to forward the second portion of the transmitter signal from the antenna to the second coupler.

10. A method, comprising:
    phase shifting a first portion of a transmitter signal to produce a phase-shifted signal, the transmitter signal being associated with a frequency;
    generating a detector signal based on an amplitude of a training sequence of the transmitter signal;
    modifying a first amplitude of the first portion of the transmitter signal based on the detector signal;
    combining the phase-shifted signal with a second portion of the transmitter signal to produce a reduced signal, the second portion of the transmitter signal being associated with a reflection of the transmitter signal from an antenna, the antenna being coupled to a homodyne transceiver;
    modifying a second amplitude of the first portion of the transmitter signal such that the second amplitude of the first portion of the transmitter signal is substantially equal to an amplitude of the second portion of the transmitter signal.

11. The method of claim 10, further comprising.
    modifying, prior to combining the phase-shifted signal with a second portion of the transmitter signal, an amplitude of the first portion of the transmitter signal such that the amplitude of the first portion of the transmitter signal is substantially equal to an amplitude of the second portion of the transmitter signal.

12. The method of claim 10, further comprising:
    prior to combining the phase-shifted signal with a second portion of the transmitter signal, setting a first level associated with a variable attenuator to produce a first signal, the first level being associated with a maximum level of a variable attenuator;
    setting a second level associated with the variable attenuator based on a detected signal associated with the first signal to produce a second signal;
    setting a first level associated with a phase shifter based on the second signal to produce a third signal, the phase shifter being associated with the phase shifting;
    setting a third level associated with the variable attenuator based on a detected signal associated with the third signal to produce a fourth signal; and
    setting a second level associated with the phase shifter based on a detected signal associated with the fourth signal.

13. The method of claim 10, further comprising:
    splitting the first portion of the transmitter signal from the second portion and a third portion of the transmitter signal; and
    transmitting the third portion of the transmitter signal from the antenna, the third portion of the transmitter signal being greater than the first portion of transmitter signal and greater than the second portion of the transmitter signal.

* * * * *